US010384574B2

(12) United States Patent
Fang (10) Patent No.: US 10,384,574 B2
(45) Date of Patent: Aug. 20, 2019

(54) UNIVERSAL CAR SEAT COVER WITH ACCURATE FIT (71) Applicant: Darlene Fang, Secaucus, NJ (US)

(72) Inventor: Darlene Fang, Secaucus, NJ (US)

( * ) Notice: Subject to any disclaimer, the term of this patent is extended or adjusted under 35 U.S.C. 154(b) by 0 days.

(21) Appl. No.: 15/956,336

(22) Filed: Apr. 18, 2018

(65) Prior Publication Data

US 2019/0039489 A1 Feb. 7, 2019

Related U.S. Application Data (60) Provisional application No. 62/541,275, filed on Aug. 4, 2017.

(51) Int. Cl.
*A47C 31/11* (2006.01)
*B60N 2/60* (2006.01)

(52) U.S. Cl.
CPC ......... *B60N 2/6063* (2013.01); *B60N 2/6036* (2013.01)

(58) Field of Classification Search
CPC ............................ B60N 2/6036; B60N 2/6063
USPC ....... 297/228.1, 228.11, 228.12, 228.13, 229
See application file for complete search history.

(56) References Cited

U.S. PATENT DOCUMENTS

| | | | | | |
|---|---|---|---|---|---|
| 4,396,227 A | * | 8/1983 | Neilson | .................. | B60N 2/609 297/228.11 |
| 4,693,511 A | * | 9/1987 | Seltzer | ................. | B60N 2/6054 297/228.11 X |
| 5,023,125 A | * | 6/1991 | Gray | ..................... | B60N 2/5833 297/228.12 X |
| 5,028,472 A | * | 7/1991 | Gray | ..................... | B60N 2/5833 297/228.12 X |
| 5,150,947 A | * | 9/1992 | Croshaw | ................. | A47C 31/11 297/229 |
| 5,234,252 A | * | 8/1993 | Wallach | ............... | B60N 2/6036 297/220 |
| 5,265,933 A | * | 11/1993 | Croshaw | ............. | B60N 2/6063 297/228.1 |
| 5,560,683 A | * | 10/1996 | Penley | ................... | A47C 31/11 297/228.13 X |
| 5,615,928 A | * | 4/1997 | Penley | ................... | A47C 31/11 297/228.13 X |
| 5,618,082 A | * | 4/1997 | Jachmich | ................ | A47C 31/11 297/219.1 |
| 5,803,539 A | * | 9/1998 | Dewar | ................. | B60N 2/6054 297/228.12 X |
| 6,067,777 A | * | 5/2000 | Stoll | .................... | B60N 2/6063 297/228.1 X |
| 6,345,866 B1 | * | 2/2002 | Jackson | ................. | A47C 31/11 297/228.12 X |
| 6,817,664 B1 | * | 11/2004 | Tang | .................... | B60N 2/5825 297/228.1 |

(Continued)

*Primary Examiner* — Rodney B White
(74) *Attorney, Agent, or Firm* — Dunlap Bennett & Ludwig PLLC (57) ABSTRACT

A universal bucket car seat cover includes a headrest cover sized to cover a removable headrest of the bucket seat, a backrest cover sized to cover a backrest of the bucket seat having an elastic trim on at least a portion of the back of the backrest cover, and a seat cover sized to cover a seat cushion of the bucket seat having a second elastic trim on at least a portion of the seat cover. The elastic trims advantageously allow for a precise fit to the car seat. A bench seat embodiment includes convenient cover components that are attachable with attachment mechanisms to adjust and/or shorten the seat cover size.

10 Claims, 6 Drawing Sheets

(56) References Cited

U.S. PATENT DOCUMENTS

| | | | | |
|---|---|---|---|---|
| 7,172,246 B1* | 2/2007 | Itakura | .................. | A47C 31/116 |
| | | | | 297/219.1 |
| 7,841,658 B1* | 11/2010 | Marble | .................... | B60N 2/60 |
| | | | | 297/228.11 X |
| 7,857,383 B2* | 12/2010 | Nguyen | ............... | B60N 2/5825 |
| | | | | 297/218.1 |
| 7,931,335 B1* | 4/2011 | Siklosi | ................. | B60N 2/6027 |
| | | | | 297/219.1 |
| 8,128,166 B2* | 3/2012 | Hoshina | ................. | B60N 2/585 |
| | | | | 297/228.11 X |
| 9,669,742 B1* | 6/2017 | Bailey | .................. | B60N 2/5816 |
| 2005/0173953 A1* | 8/2005 | Riley | .................... | A47C 31/11 |
| | | | | 297/228.1 |
| 2007/0029852 A1* | 2/2007 | Kobayashi | ............... | B60N 2/58 |
| | | | | 297/228.11 |
| 2007/0040426 A1* | 2/2007 | Kenny | ................. | B60N 2/6018 |
| | | | | 297/229 |
| 2008/0001451 A1* | 1/2008 | Olson | .................. | B60N 2/2881 |
| | | | | 297/219.12 |
| 2009/0284056 A1* | 11/2009 | Chico | .................. | A47C 31/113 |
| | | | | 297/228.1 |
| 2015/0069804 A1* | 3/2015 | Long | .................... | B60N 2/6036 |
| | | | | 297/228.13 |
| 2015/0102645 A1* | 4/2015 | Rogan | .................... | A47C 31/11 |
| | | | | 297/228.11 |
| 2015/0197172 A1* | 7/2015 | Durnil | .................. | B60N 2/6063 |
| | | | | 297/229 X |
| 2016/0059756 A1* | 3/2016 | Matsuhashi | ............... | B60N 2/60 |
| | | | | 297/228.12 |
| 2017/0253159 A1* | 9/2017 | Lopatin | ................ | B60N 2/6063 |
| 2018/0304784 A1* | 10/2018 | Ricks | .................. | B60N 2/6063 |

* cited by examiner

UNIVERSAL CAR SEAT COVER WITH ACCURATE FIT

CROSS-REFERENCE TO RELATED APPLICATION

This application claims the benefit of priority of U.S. provisional application No. 62/541,275 filed on Aug. 4, 2017, the contents of which are herein incorporated by reference.

BACKGROUND OF THE INVENTION

This invention relates to car seat covers, and more particularly, to a car seat cover for a universal fit.

Car seats come in many varieties of sizes, shapes, and styles. This often makes it difficult to find seat covers that fit well unless they are custom made, which can be expensive. Universal seat covers and seat covers are often low quality and lack the form and fit needed to make them look attractive on the seats. Universal fit generally means the cover can fit most seats, but the fit leaves much to be desired in terms of aesthetics and function. The baggy covers often slide off the seats and over time, and the covers may flatten out of shape.

There exists a need for a universal car seat cover that provides an accurate fit and remains in place while maintaining its shape.

SUMMARY

A car front bucket seat cover includes a headrest cover sized to cover a removable headrest of the bucket seat, a backrest cover sized to cover a backrest of the bucket seat, the backrest having an opening sized to allow an insertion of the backrest of the bucket seat, the backrest cover having a first elastic trim on at least a portion of the back of the backrest cover, and a seat cover sized to cover a seat cushion of the bucket seat, the seat cover having an opening on a backside, the seat cover having a second elastic trim on at least a portion of the seat cover.

In one embodiment, the headrest cover, the backrest cover, and the seat cover are all separate pieces.

In another embodiment, the first elastic trim is around a right top corner of the backside of the backrest cover and an additional elastic trim is around a left top corner of the backside of the backrest cover.

In one embodiment, a backside of the backrest cover includes a center opening.

In one embodiment, the opening comprises a hook and loop fastener to open and close the opening.

In one embodiment, the first elastic trim is along an entire edge of the backside of the backrest cover.

In one embodiment, the second elastic trim is around a right front corner of the seat cover and a left elastic trim is around a left front corner of the seat cover.

In one embodiment, the headrest cover, the backrest cover, and the seat cover each include a silicone interior lining.

In one embodiment, wherein the elastic trim is along an entire edge of a front of seat cover.

A car rear bench seat cover includes three headrest covers, a right backrest cover having a first attachment mechanism at least along a left edge, a left backrest cover having a second attachment mechanism at least along a right edge, a center backrest attachment piece having a third attachment mechanism at least along a right edge and a fourth attachment mechanism at least along a left edge, wherein the first attachment mechanism attaches to the third attachment mechanism and the second attachment mechanism attaches to the fourth attachment mechanism. The car bench seat cover further includes a left seat cover having a fifth attachment mechanism at least along a right edge, a right seat cover having a sixth attachment mechanism at least along a left edge, and a center seat cover attachment piece having an attachment mechanism on an entire back and all edges of the center seat cover attachment piece, the fifth attachment mechanism and the sixth attachment mechanism attaching to the attachment mechanism on the edges of the center seat cover attachment piece.

In one embodiment, the three headrest covers cover three removable headrests of a bench seat. In one embodiment, each headrest cover is attached to the left backrest cover, the right backrest cover, or the center backrest attachment piece.

In one embodiment, the first attachment mechanism, second attachment mechanism, fifth attachment mechanism, and sixth attachment are all made of a hook material and the third attachment mechanism, fourth attachment, and attachment mechanism on the back and edges of the center seat cover attachment are made of a loop material.

In one embodiment, the first attachment mechanism, second attachment mechanism, fifth attachment mechanism, and sixth attachment are all made of a loop material and the third attachment mechanism, fourth attachment, and attachment mechanism on the back and edges of the center seat cover attachment are made of a hook material.

In one embodiment, the three headrest covers, the right seat cover, and the left seat cover each include a silicone interior lining. The right backrest cover and the left backrest cover each include a loop material lining.

In one embodiment, the first attachment mechanism, second attachment mechanism, third attachment mechanism, and fourth attachment mechanism are all zippers.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for illustrating the general principles of the invention, since the scope of the invention is best defined by the appended claims.

Car seats come in many varieties of shapes, sizes, and styles which make it difficult to find seat covers that fit well unless they are custom made, thus increasing their cost. The invention claimed here provides a solution to that problem.

Broadly, one embodiment of the present invention is a car seat cover including elastic areas that allow the cover to stretch and snugly fit most shape seats. In one embodiment, the car seat cover is made of high-density foam, which creates resilience and provides an aesthetically pleasing and functional fit. Beneficially, it keeps production costs low and thus, the seat covers affordable.

Advantageously, the general shape of the seat cover provides a universal fit, while the elastic areas provide the more accurate fit, keeping the covers in place. The high-density foam provides a solid form-fitting silhouette that sustains its shape over time. Currently, the only way to get an accurate fit of a car seat cover is to purchase custom seat covers or seat covers made specifically for that make, model, and year of a vehicle.

Figure 1:
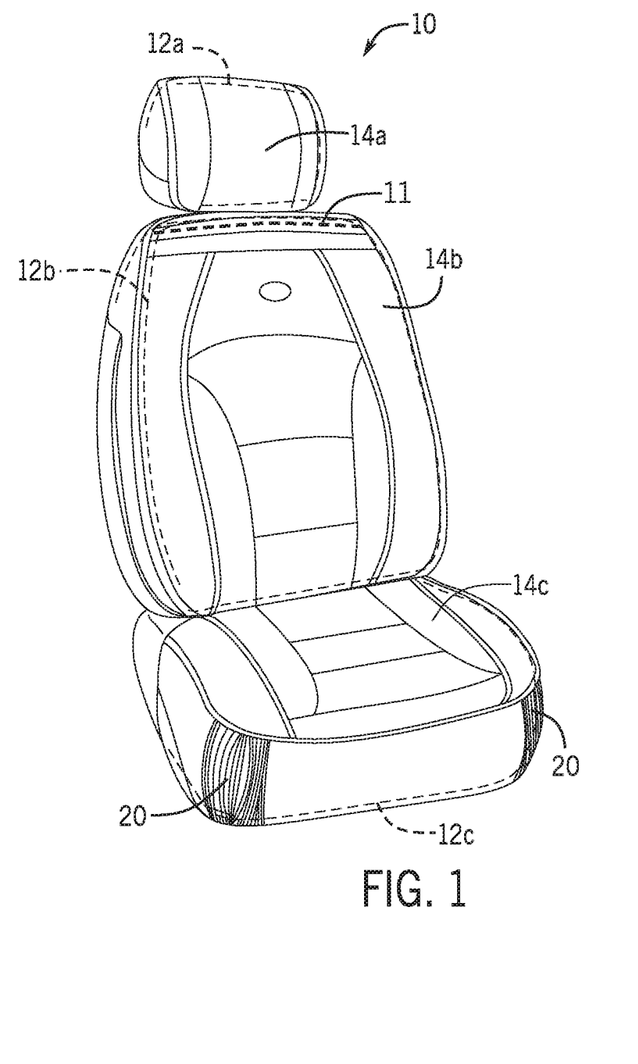
FIG. 1 shows one embodiment of a perspective view of a car seat cover.
Figure 2:
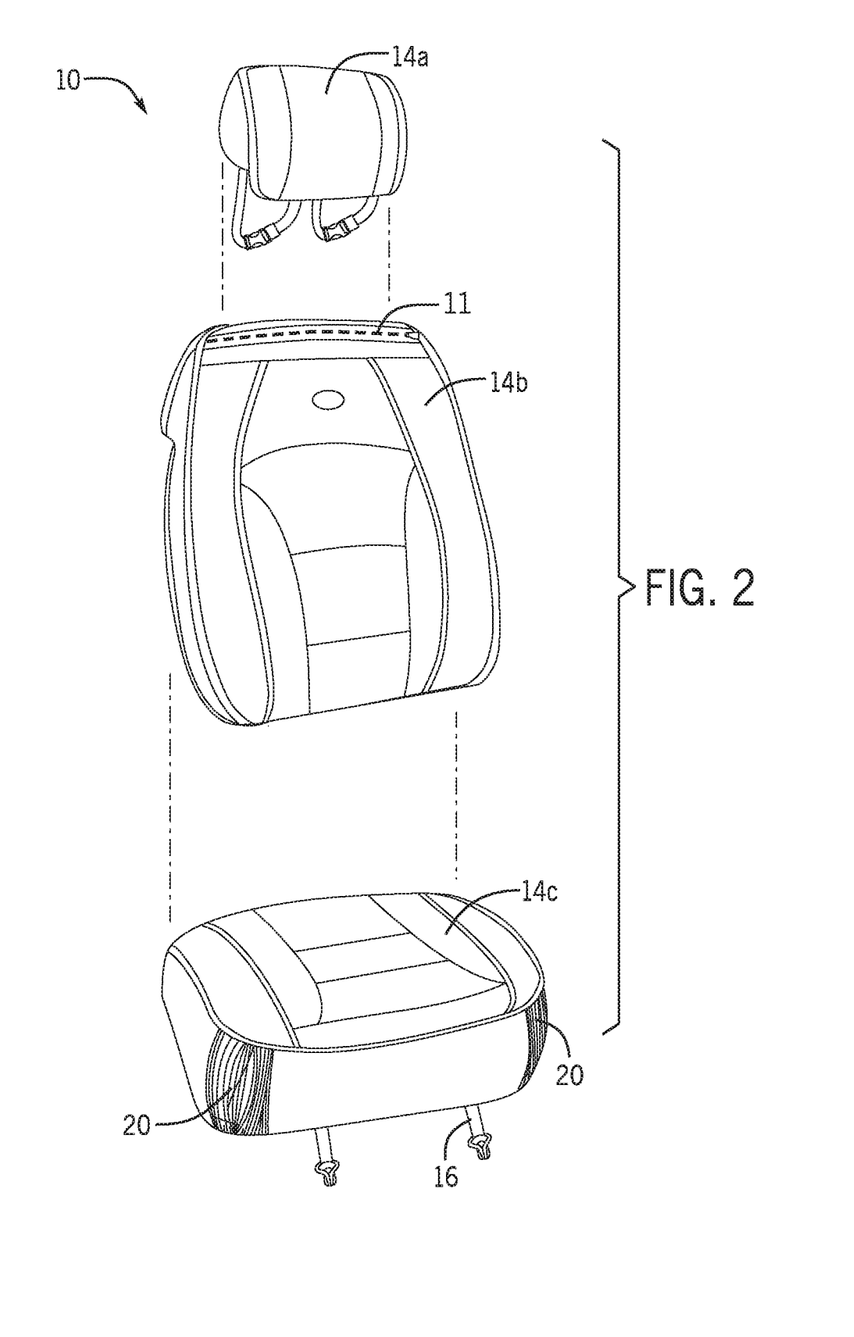
FIG. 2 shows an exploded perspective view of one embodiment of the car seat cover.

As shown in the embodiment of FIG. 1, a bucket seat embodiment of a universal car seat cover 10 includes a removable headrest 12a with a headrest cover 14a, a backrest 12b with a backrest cover 14b, and a seat cushion 12c with a seat cover 14c. FIG. 2 shows an exploded view of the bucket seat embodiment of the universal car seat cover 10.

As shown in the embodiment of FIG. 2, the headrest cover 14a is flap shaped and wraps around the removable headrest 12a of the car seat. It is secured and can be tightened with buckle straps. In one embodiment, a center of the headrest cover 14a includes one or more piping. The headrest cover 14a includes a silicone interior to hold the headrest cover 14a in place and prevents it from sliding off the removable headrest 12a.

In one embodiment, the backrest cover 14b includes a hook and loop fastener top 11 extending across the left and right sides of the top of the backrest cover 14b for easy opening and closure. The backrest cover 14b includes an opening at a bottom end, to simply slip the backrest cover 14b on the backrest 12b.

In one embodiment, the hook and loop fastener top 11 runs across the entire top to close the opening after reinsertion of the removable headrest 12a. In one embodiment, the backrest cover 14b includes a logo on the center towards the top.

Figure 3:
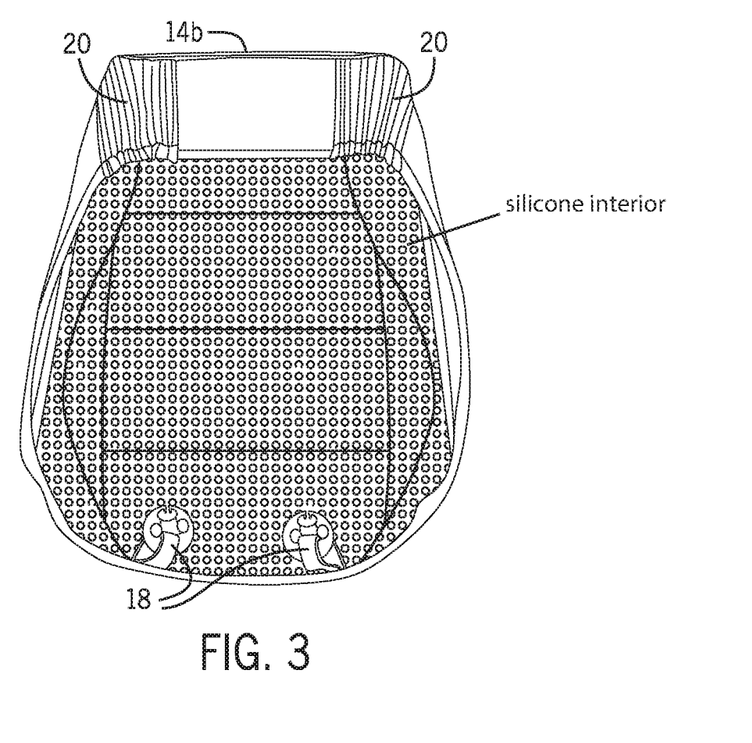
FIG. 3 shows one embodiment of a rear view of a backrest cover of the car seat cover.

In one embodiment, side panels of the backrest seat cover 14b are accentuated with piping on one or both sides. A center of backrest cover 14b is designed with linings. The linings are accentuated with piping on one or both sides. In one embodiment as shown in FIG. 3, an edge of a backside of the backrest cover 14b extends about five inches below a top of the backseat. In other embodiments, the edge of the backside of backrest cover 14b extends more than five inches below the top of backseat and can extend to the bottom of the seat backrest. In another embodiment, the edge of the backside of the backrest cover 14b extends less than five inches below a top of the backseat. In an alternative embodiment, the backside of the backrest cover 14b has no rear opening as shown, and only includes the hook and loop fastener top 11 of the backrest cover 14b.

In one embodiment, the backrest cover 14b includes an elastic trim 20 on the right and left proximal corners of the back for an adjustable fit to the backrest 12b.

In one embodiment, the elastic trim 20 is about six inches long. In other embodiments, the elastic trim 20 is longer or shorter than six inches. In alternative embodiments, the elastic trim is in the middle, sides, or all along the edges of the backrest cover 14b.

Edges of the backrest cover 14b are made with an extra layer of material, sewn or otherwise attached, on top to conceal the seams and add to the aesthetics of the cover. In one embodiment, elastic loops 18 are attached to a distal end of the backrest cover 14b to allow for manual maneuvering of the bottom of the backrest cover 14b.

In one embodiment, the elastic loops 18 also work with butterfly discs to secure the cover by pushing the loops 18 and discs through the bucket seat crevice and pulling the discs flat against the back of the seat. In one embodiment, the backrest cover 14b also includes a silicone interior to hold the cover 14b in place and prevent it from sliding.

In one embodiment, the seat cover 14c includes side panels that can be accentuated with piping on both sides. The seat cover 14c is designed with linings. The linings are accentuated with piping on one or both sides. The seat cover 14c includes the elastic trim 20 for an adjustable fit. In one embodiment, the elastic trim 20 is on a left and right corner to provide an accurate fit around seat cushion 12c. In one embodiment, the elastic trim 20 is about six inches in length. In alternative embodiments, the elastic trim 20 is along the middle, sides, or anywhere on the seat cover 14c edges. In alternative embodiments, the elastic trim can be longer or shorter than six inches.

As shown in FIG. 2, the seat cover 14c include one or more elastic loops 16 to allow for easy maneuvering of the seat cover 14c. The loops 16 also work with the butterfly discs to secure the cover by pushing the loops and discs through the bucket seat crevice and pulling the discs flat against the back of the seat.

Figure 13:
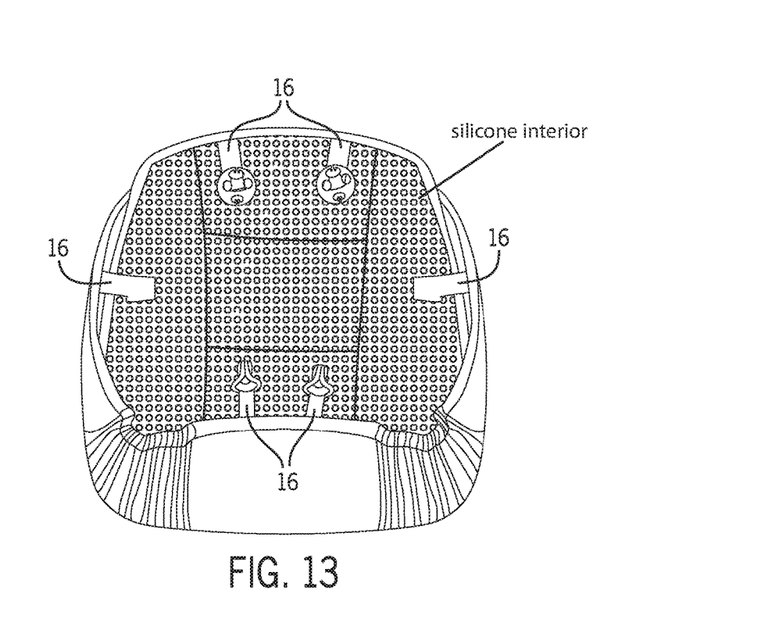
FIG. 13 shows a rear view of the seat car seat cover.

As shown in the rear view embodiment of seat cover 14c in FIG. 13, the loops 16 also work with the butterfly discs or hooks to secure the cover 14c by pushing the loops 16 and discs through the bucket seat crevice and pulling the discs flat against the back of the seat.

In one embodiment, exterior edges and interior edges of the components of the seat cover 14c are made with an extra layer of material, sewn or otherwise attached, on top to conceal the seams and add to the aesthetics of the cover. In one embodiment, the seat cover 14c includes a silicone interior to hold the cover in place and prevent it from sliding.

Figure 8:
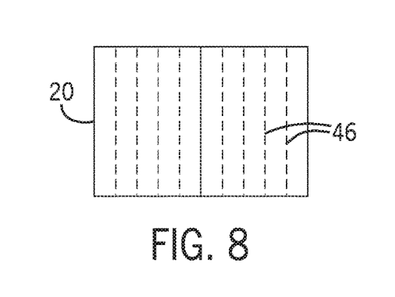
FIG. 8 is a detail plan view of one embodiment of an elastic material.
Figure 9:
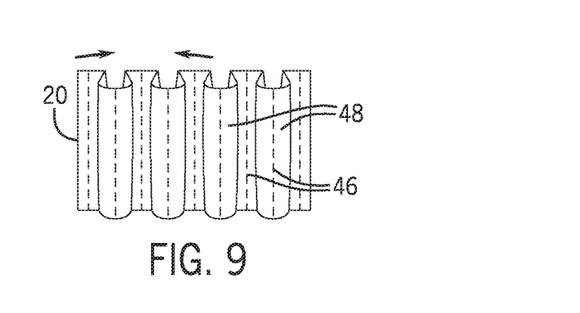
FIG. 9 is a detail perspective view of the folded elastic material.
Figure 10:
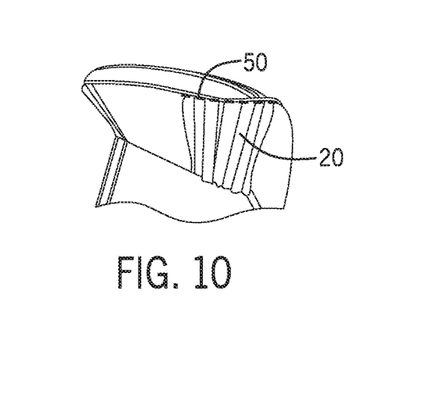
FIG. 10 is a perspective view of a top end of the elastic material.
Figure 11:
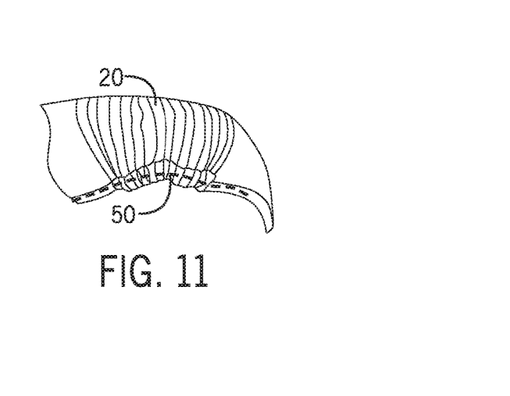
FIG. 11 is a perspective view of a distal end of the elastic material.

FIGS. 8-11 show one embodiment of the elastic trim 20 as used on the described components of the car seat cover. The elastic trim 20 includes stitches 46 as shown in FIG. 8, sewn or otherwise attached on the trim material. As shown in FIGS. 9 and 10, the elastic trim 20 includes folded material 48 with a top end that is stitched across with elastic string 50. As shown in FIG. 11, a distal end also has the elastic string 50 inserted through it and sewn or otherwise sealed shut, such that it can stretch and accurately fit around car seat edges. The elastic trim 20 advantageously also allows for easy expansion if installed on bigger sized seats. In one embodiment, the elastic trim 20 is about six inches long. In alternative embodiments it can be shorter or longer than six inches. In alternative embodiments, the elastic trim 20 can be any suitable type of elastic material.

Figure 4:
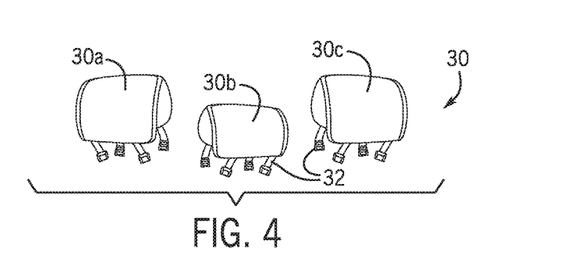
FIG. 4 shows an exploded perspective view of headrest covers of a bench seat embodiment.
Figure 5:
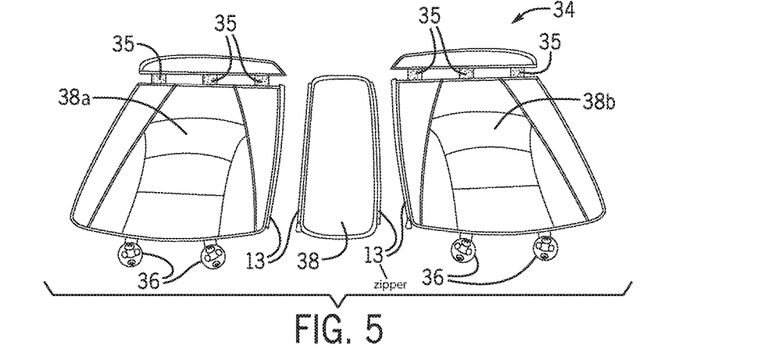
FIG. 5 shows is an exploded perspective view of backrest covers of the bench seat embodiment.
Figure 6:
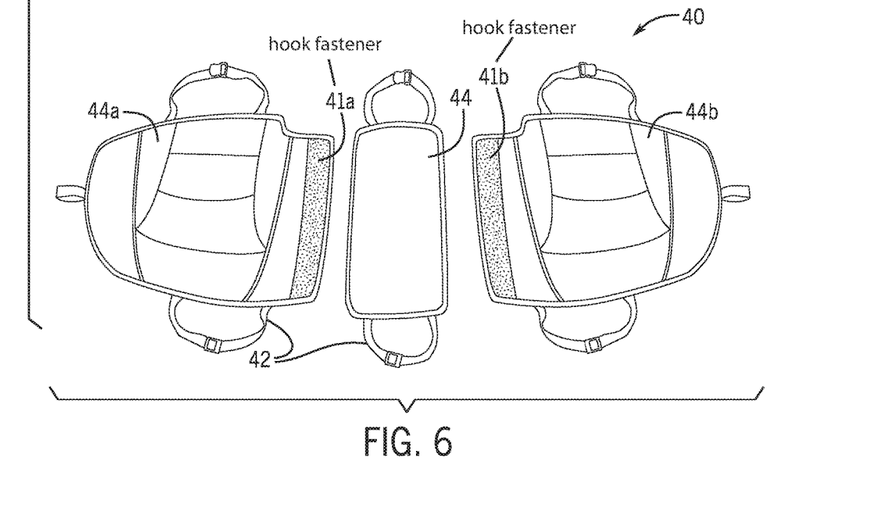
FIG. 6 shows an exploded perspective view of seat covers of the bench seat embodiment of the invention.

In a bench seat embodiment 10b of the car seat as shown in FIGS. 4, 5, 6, and 7, a cover includes three headrest covers; a left cover 30a, a right cover 30c, and a center cover 30b for the headrest 30 (FIG. 4); a left backrest cover 38c, a right backrest cover 38b, and a center cover 38 for a backrest 34 (FIG. 5); and a left seat cover 44a, a right seat cover 44b, and a center seat cover 44 for bench seat 40 (FIG. 6).

In one embodiment, the headrest covers 30a, 30b, and 30c are flap shaped and wrap around the headrest of the car seat. They are secured and tightened with buckle straps 32.

In one embodiment, the backrest cover 34 is connected by zippers 13 on the left and right edges of the backrest covers 38b and 38a and a center attachment 38. Alternatively, as shown in the back-view embodiment of FIG. 12, the cover 34 is adjusted/shortened by a hook attachment 39 on each side of the back of the center cover 38 and a loop attachment 37a and 37b on each side of the backrest covers 38b and 38c. In one embodiment, the entire back of cover 34 is made of a loop material. The hook attachment 39 and loop materials 37a and 37b are used adjust the backrest cover to a shorter width. The three covers together achieve the adjustable width. In one embodiment, the backrest cover width can be adjusted between about 44 inches to 65 inches.

In one embodiment, a top of cover backrest 34 includes an additional header piece connected with three hook pieces 35 to use in conjunction with the back of a loop material of cover 34 to hold the backrest cover 34 in place as well as for easy reinsertion of the car headrest 30.

In one embodiment, side panels of the back-seat cover 34 are accented with piping on one or both sides. The center of cover 34 are designed with linings. The linings are accentuated with piping on one or both sides. One or more elastic straps 36 are attached to the distal end of the backseat cover 34 to allow for manual maneuvering of the bottom of the backseat cover 34. The elastic straps 36 also work with butterfly discs to secure the cover by pushing the loops through the bench seat crevice and pulling the discs flat against the back of the seat.

Figure 12:
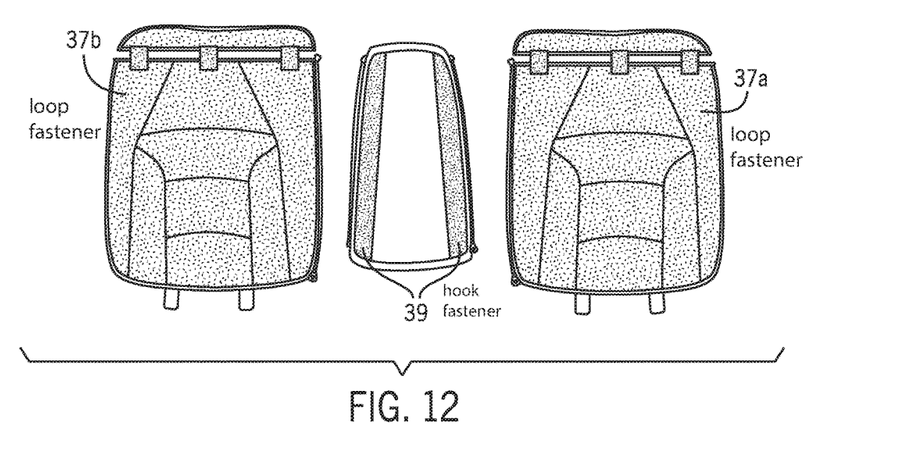
FIG. 12 shows a back view of a backrest cover of the bench seat embodiment.

In one embodiment, the center piece 38 is reversible. If the backrest cover 34 needs to be shortened in width, the center piece 38 is reversed and the hook material 39 is used to attach to loop materials 37a and 37b of left and right covers 38b and 38c.

Figure 7:
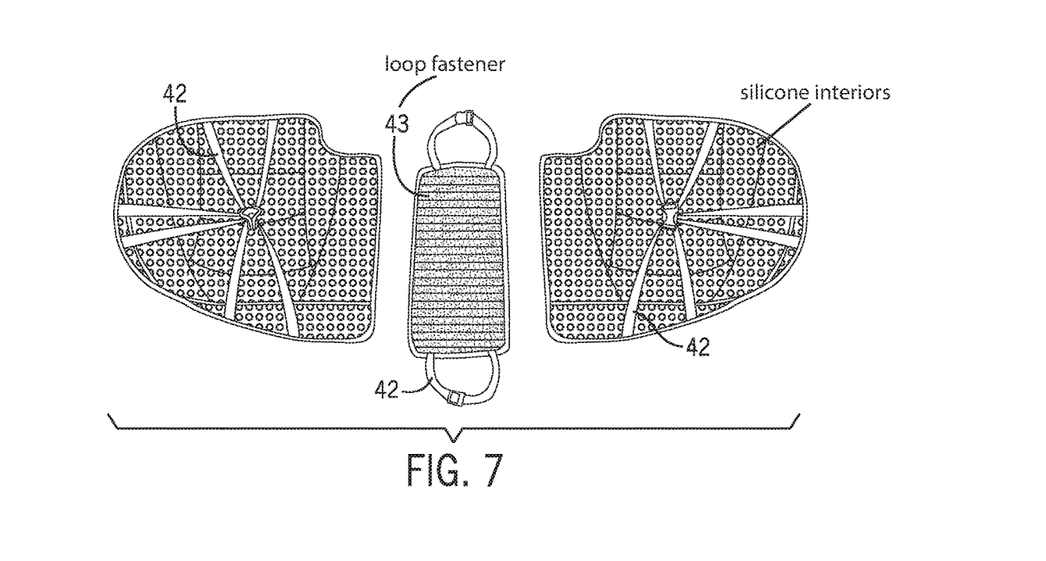
FIG. 7 is an exploded perspective view of a bottom of seat covers of the bench seat embodiment of the invention.

As shown in FIGS. 6 and 7, the left seat cover 44a and the right cover 44b are connected by a hook material 41a and 41b to a loop material 43 on a back of the center seat cover 44. The inner right perimeter of the left seat cover 44a and an inner left perimeter of the right seat cover 44b include the respective hook materials 41a and 41b, which can be used in conjunction with the loop material 43 on the back of central seat cover 44 to connect the left seat cover 44a and right seat 44b together. The bench seat cover 40 can be shortened or adjusted in width by adjusting the hook 41a and loop 41b attachments.

In one embodiment, the right seat 44a and the left seat cover 44b are made of silicone, which locks the cover in place, providing an anti-slip effect. In one embodiment, the left and right seat covers 44a and 44b include side panels that are accentuated with piping on both sides. The center of the seat cover 44 is designed with linings. The linings are accented with piping on one or both sides.

In one embodiment as shown in FIG. 7, the back of seat cover 40 includes two or more elastic straps 42 that fasten together with buckles or hooks for extra security. The stitching of seat cover 44 is made with an extra layer of material, sewn or otherwise attached on top to conceal the seams and add a layer of protection and aesthetic effect.

It should be understood that in alternative embodiments of the bench seat embodiment, any of the hook or loop materials can be zippers, buttons, magnets, or any other suitable attachment mechanisms. It is also to be understood that the hook and loop materials can be reversed. The described location of the hook materials can be loop materials and the described location of the loop materials can be hook materials.

Advantageously, the seat cover works on smaller and larger size front car seats, as well as longer and shorter size back bench seats. High-density foam backing creates resilience and the silicone interior holds the cover in place. Compared to other seat covers, it will not slip easily. The cover avoids loose hanging materials and the cover will not flatten in shape over time.

In one embodiment, all pieces can be made of faux leather with high-density foam backing and silicone interior. It is to be understood, however, that all pieces can be made of any suitable material.

It should be understood, of course, that the foregoing relates to exemplary embodiments of the invention and that modifications may be made without departing from the spirit and scope of the invention as set forth in the following claims.

What is claimed is:

1. A car front bucket seat cover comprising:
   a headrest cover sized to cover a removable headrest of the bucket seat;
   a backrest cover sized to cover a backrest of the bucket seat, the backrest having a first opening including a fastener that is adapted to be opened and closed, the first opening sized to allow an insertion of an upper portion of a backrest of the bucket seat and a second opening at a back of the backrest cover sized to allow the backrest to cover a backrest of the bucket seat, the backrest cover having a first elastic trim on at least a portion of the back of the backrest cover; and
   a seat cover sized to cover a seat cushion of the bucket seat, the seat cover having a back opening on a backside, the seat cover having a second elastic trim on at least a portion of the seat cover;
   wherein the headrest cover, the backrest cover, and the seat cover are all separate pieces;
   wherein the second elastic trim includes a right elastic trim around a right front corner of the seat cover and a left elastic trim around a left front corner of the seat cover; and
   wherein the headrest cover, the backrest cover, and the seat cover each include a non-slip interior lining.

2. The car front bucket seat cover of claim 1, wherein the first elastic trim is around a right top corner of the backside of the backrest cover and an additional elastic trim is around a left top corner of the backside of the backrest cover.

3. The car front bucket seat cover of claim 1, wherein the first opening comprises a hook and loop fastener to open and close the opening.

4. The car front bucket seat cover of claim 1, wherein the first elastic trim is along an entire edge of the backside of the backrest cover.

5. The car front bucket seat cover of claim 1, wherein the headrest cover, the backrest cover, and the seat cover each include a silicone interior lining.

6. The car front bucket seat cover of claim 1, wherein the second elastic trim is along an entire edge of a front of the seat cover.

7. A car rear bench seat cover comprising:
three headrest covers;
a backrest cover comprising;
   a right backrest cover having a first hook or loop attachment mechanism at least along a left edge;
   a left backrest cover having a second hook or loop attachment mechanism at least along a right edge; and
   a center backrest attachment piece having a third hook or loop attachment mechanism at least along a right edge and a fourth hook or loop attachment mechanism at least along a left edge, wherein the first hook or loop attachment mechanism attaches to the third hook or loop attachment mechanism, wherein the third hook or loop attachment mechanism is complementary to the first hook or loop attachment mechanism, and the second hook or loop attachment mechanism attaches to the fourth hook or loop attachment mechanism, wherein the fourth hook or loop attachment mechanism is complementary to the second hook or loop attachment mechanism, wherein the first hook or loop attachment mechanism, the second hook or loop attachment mechanism, the third hook or loop attachment mechanism, and the fourth hook or loop attachment mechanism are adapted to adjust the width of the backrest cover; and
a seat cover comprising;
   a left seat cover having a fifth hook or loop attachment mechanism at least along a right edge;
   a right seat cover having a sixth hook or loop attachment mechanism at least along a left edge; and
   a center seat cover attachment piece having a hook or loop attachment mechanism on an entire back and all edges of the center seat cover attachment piece, the fifth hook or loop attachment mechanism and the sixth hook or loop attachment mechanism attaching to the hook or loop attachment mechanism of the center seat cover attachment piece, the hook or loop mechanism of the center seat cover attachment piece being complementary to the fifth and sixth hook or loop attachment mechanisms, the fifth and sixth hook or loop attachment mechanisms and the hook or loop mechanism of the center seat cover attachment adapted to adjust the width of the seat cover.

8. The car rear bench seat cover of claim 7 wherein the three headrest covers cover three removable headrests of a bench seat.

9. The car rear bench seat cover of claim 7 wherein each headrest cover is attached to the left backrest cover, the right backrest cover, or the center backrest attachment piece.

10. The car rear bench seat cover of claim 7, wherein the three headrest covers, the right seat cover, and the left seat cover each include a non-slip interior lining.

* * * * *